Figure 1:
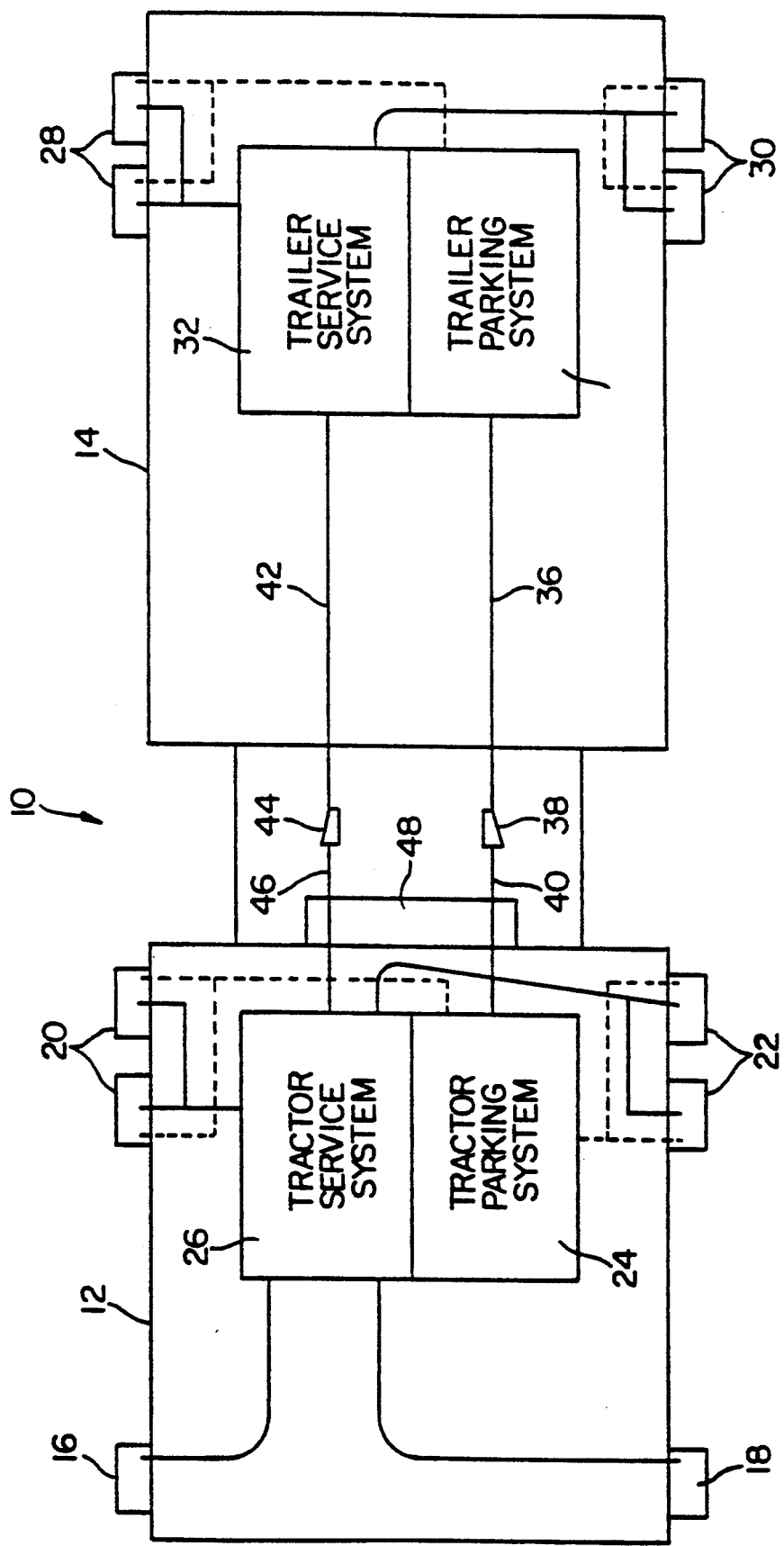

United States Patent [19]

Eberling

[11] Patent Number: 5,226,692
[45] Date of Patent: Jul. 13, 1993

[54] FLUID PRESSURE BRAKING SYSTEM
[75] Inventor: Charles E. Eberling, Wellington, Ohio
[73] Assignee: Allied-Signal Inc., Morristown, N.J.
[21] Appl. No.: 765,854
[22] Filed: Sep. 26, 1991
[51] Int. Cl.$^5$ ............................................. B60T 13/00
[52] U.S. Cl. ............................................. 303/8; 303/14; 303/60
[58] Field of Search ............... 303/13, 14, 7, 8, 26, 303/59, 60, 44, 86, 53-55

[56] References Cited
U.S. PATENT DOCUMENTS

| | | | |
|---|---|---|---|
| 3,929,381 | 12/1975 | Durling | 303/7 X |
| 4,407,549 | 10/1983 | Graham | 303/13 X |
| 4,629,256 | 12/1986 | Fannin | 303/8 |
| 5,036,961 | 8/1991 | Eberling et al. | 303/13 X |

Primary Examiner—Robert J. Oberleitner
Assistant Examiner—Lee W. Young
Attorney, Agent, or Firm—Ken C. Decker; William N. Antonis

[57] ABSTRACT

A limited service application of the service brakes of the trailer portion of a tractor trailer combination vehicle is applied and held while the vehicle operator gets out of the cab to make a pre-trip inspection. The service actuation is initiated by releasing the trailer parking brakes while the tractor parking brakes remain applied and then making a momentary service brake actuation by use of the vehicle dual control valve. A control valve assembly responds to the service actuation to hold a service actuation of the trailer brakes until either the tractor parking brakes are released or the trailer parking brakes are applied.

9 Claims, 2 Drawing Sheets

FLUID PRESSURE BRAKING SYSTEM

This invention relates to a fluid pressure braking system.

It is required that the driver of a tractor-trailer combination vehicle make a pre-trip inspection. After the driver starts the engine and is prepared to leave on the trip, the driver gets out of the vehicle and walks around the vehicle to make sure that the vehicle is in safe operating condition. The driver checks such things as the tires, the couplings connecting the braking system of the trailer and tractor, the stop lights, etc. The pre-trip inspection requires that a trailer service brake application be effected so that couplings and the stop lights may be checked. In existing braking systems, the service actuation is effected by operation of the trailer hand control valve. However, use of the trailer hand control valve is unsatisfactory for a number of reasons, such as the fact that the parking brakes are released and because the driver is allowed to make a brake application of such magnitude that the brakes may be overstressed. The present invention allows the driver to make and hold a trailer service brake application only while the parking brakes of the tractor are applied. The limited service actuation is automatically terminated when the tractor parking brakes are released or when the trailer parking brakes are applied. Accordingly, the driver can make a pre-trip inspection safely.

Figure 2:
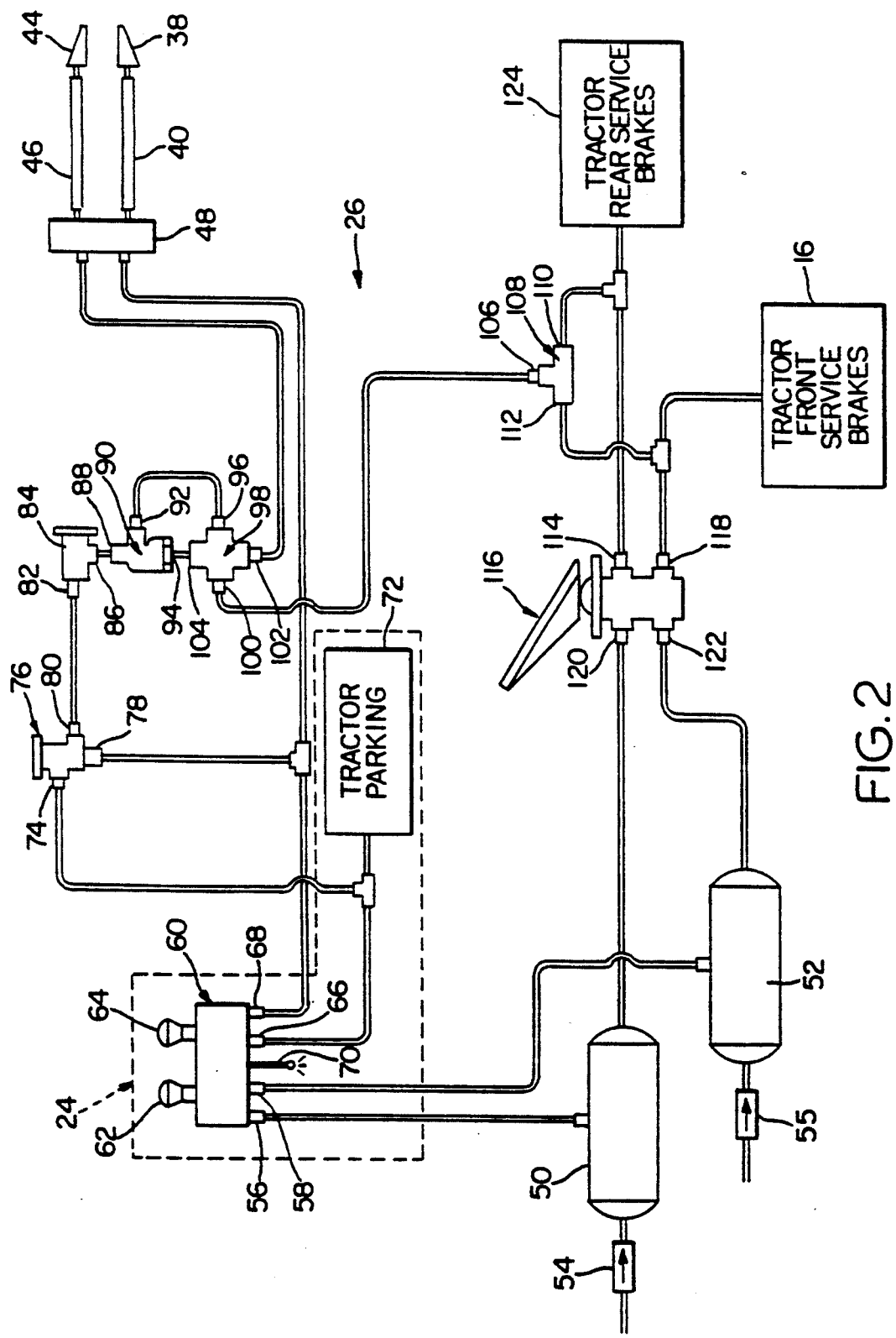

These and other advantages of the present invention will become apparent from the following description, with reference to the accompanying drawings, in which:

FIG. 1 is a schematic illustration of the braking systems of the tractor and trailer of a tractor-trailer combination vehicle; and FIG. 2 is a diagrammatic illustration of a vehicle braking system incorporating the service brake holding feature of the present invention.

Referring now to the drawings, a tractor-trailer combination vehicle indicated generally by the numeral 10 in FIG. 1 includes a tractor portion 12 and a trailer portion 14. Tractor portion 12 includes front service brakes 16 and 18 and rear tandem service brakes/spring brakes 20 and 22. The brakes 16, 18, 20 and 22 are conventional. The tandem actuators 20, 22 incorporate fluid pressure operated service actuators, and also incorporate spring actuators which are held off by fluid pressure. Accordingly, in order to move the vehicle, the spring actuators must be overcome by fluid pressure generated from the tractor parking system 24. The conduits communicating fluid pressure to the spring actuators are indicated diagrammatically by the dashed lines in FIG. 1. The service actuators are provided with compressed air when the operator effects a service brake application during normal operation of the vehicle by the tractor service system generally indicated by the numeral 26. The conduits supplying fluid pressure to the service actuators are indicated by solid lines in FIG. 1. Both the tractor parking system 24 and the tractor service system 26, aside from the subsystem illustrated in FIG. 2 which allows the operator to effect and hold a limited trailer service actuation, are conventional. Although illustrated as separate systems, the service and parking systems are equipped with some common components. For example, pressure is supplied to both systems from common reservoirs, as is well known to those skilled in the art and will be explained hereinafter.

The trailer 14 is equipped with tandem brake actuators 28, 30. The service portion of the tandem actuators 28, 30 are controlled by a trailer service actuation system generally indicated by the numeral 32, which is under control of the vehicle operator during normal operation of the vehicle. Pressure to the spring actuators incorporated within tandem actuators 28, 30 is supplied by the trailer parking system 34. Pressure must be communicated to the spring actuators in order that they may be released so the vehicle may be moved. Again, although the systems 32 and 34 are indicated as entirely separate, they do share common components, such as the reservoirs.

Pressure is supplied to the reservoirs forming a part of the systems 32 and 34 through a trailer supply line portion 36. Trailer supply line portion 36 is communicated with the tractor 12 through supply coupling 38, which couples the supply line portion 36 carried by the trailer 14 with the portion 40 of the supply line carried by the tractor. The signal generated by the vehicle operator in order to effect a service brake application is communicated to the trailer service system 32 through service line portion 42 carried by the trailer 14. Trailer service line portion 42 carried by the trailer 14 is coupled via a coupling 44 to service line portion 46 carried by the tractor 12 which connects with the vehicle brake valve so that when the vehicle operator effects a service brake application a control signal is transmitted through the service line portions 42, 46 in order to effect a trailer service application in a manner well known to those skilled in the art. Both the portions 40, 46 extend through a conventional tractor protection valve 48. Accordingly, when a service actuation is effected by foot operation of the brake control valve, a control signal is transmitted through portions 42 and 46 to the trailer service system 32, which effects a trailer service actuation. When the vehicle has been parked and is to be moved, the operator releases the tractor and trailer parking brakes by operating the appropriate controls to communicate fluid pressure to the spring brake portion of the tandem actuators by control of the parking systems 24 and 34.

Referring now to FIG. 2, the tractor parking system 24 is enclosed by the dashed lines and the tractor service system 26 are those components located outside of the dashed lines, it being remembered that reservoirs 50, 52 supply compressed air to both systems 24 and 26. Reservoirs 50 and 52 are communicated to the vehicle air compressor (not shown) through inlet check valves 54, 56. Each of the reservoirs 50, 52 are communicated with corresponding supply ports 56, 58 of a modular dash control valve generally indicated by the numeral 60. Control valve 60 is of the same general type as disclosed in U.S. Pat. No. 4,844,553, and is equipped with conventional push/pull knobs 62, 64 which are accessible to the vehicle operator on the dash of the vehicle. A check valve (not shown) internal to the control valve 60 selects the higher of the pressure levels at supply port 56, 58. When knob 62 is pushed in, the selected supply pressure is communicated to delivery port 66 of modular valve 60, and when knob 64 is pushed in, the selected supply pressure is communicated to delivery port 68. If knob 62 is pulled out, the pressure at delivery port 66 is vented to exhaust port 70, and if knob 64 is pulled out, the pressure at delivery port 68 is communicated to the exhaust port 70. The delivery port 66 is communicated to the tractor parking actuators 72, which are the aforementioned spring brake actuators incorporated within the tandem actuators 20, 22. The delivery port 68 is communicated through the tractor protection valve 48 to the trailer supply line 40 and coupling 38.

Delivery port 66 is also communicated with a control port 74 of an inversion valve generally indicated by the numeral 76. The delivery port 68 of control valve 60 is also communicated to supply port 78 of inversion valve 76. The inversion valve 76 is conventional, and normally communicates supply port 78 to delivery port 80 thereof. However, when the pressure level at the control port 74 increases above a predetermined pressure, communication between supply port 78 and delivery port 80 is terminated, and delivery port 80 is vented to atmosphere. The delivery port 80 of inversion valve 76 is communicated to supply port 82 of a pressure reducing valve 84. Pressure reducing valve 84 is conventional, and limits the pressure delivered on its delivery port 86 thereof to a predetermined level, regardless of the pressure level applied to supply port 82.

The delivery port 86 of pressure reducing valve 84 is connected to supply port 88 of a synchronizing valve 90. Synchronizing valve 90 further includes a delivery port 92 and a control port 94. Synchronizing valve 90 is conventional, and responds to a pressure signal exceeding a predetermined valve at the control port 94 thereof to open the supply port 88 to the delivery port 90. When the pressure at the control port 94 drops below the predetermined level, the valve closes to terminate communication between supply port 88 and delivery port 92, and to vent delivery port 92. The synchronizing valve 90 is conventional, and will not be described in detail.

Delivery port 92 of synchronizing valve 90 is communicated to an inlet port 96 of a conventional double check valve generally indicated by the numeral 98. Check valve 98 includes the inlet port 96, another inlet port 100, and outlet ports 102, 104. Outlet port 104 is connected to the control port 94 of synchronizing valve 90, and outlet port 102 is communicated to the trailer service line portion 46 through the trailer protection valve 48. The double check valve 98 selects the higher of the pressure levels at the inlet ports 96, 100 for communication to the outlet ports 102, 104.

Inlet port 100 of check valve 98 is communicated to the outlet port 106 of another double check valve 108. Double check valve 108 selects the higher of the pressure levels at inlet ports 110, 112 thereof for communication to the port 100 of double check valve 98. Port 110 of double check valve 108 is communicated to delivery port 114 of a conventional, dual, foot operated, brake valve generally indicated by the numeral 116. The inlet port 112 of double check valve 108 is connected to delivery port 118 of brake valve 116. Brake valve 116 is conventional, and further includes supply or inlet ports 120, 122 which are connected respectively to the reservoirs 50, 52. The valve 116 is operated by the driver's foot, and effects a brake application by opening supply port 120 to delivery port 114 and simultaneously opening supply port 122 to delivery port 118. Delivery port 114 is connected to effect an actuation of the service brake portions indicated at 124 of the tandem actuators 20, 22, and the port 118 is connected to effect a brake application of the front service actuators 18.

In operation, the vehicle operator starts the vehicle and otherwise prepares for the trip. As a part of the preparation, a pre-trip inspection is performed, which requires that a limited trailer service brake application be effected and held so that the pre-trip inspection may be performed. Accordingly, the vehicle operator releases the trailer spring brakes by pushing in the knob 64, thereby delivering fluid pressure through the trailer supply line 40, to thereby charge the trailer reservoirs (not shown) and to thereby effect release of the trailer spring brake actuators. The knob 62 remains in its out position, so that the tractor parking brakes indicated at 72 remain vented and therefore remain applied by their spring actuators. Accordingly, pressure is delivered to supply port 78 of inversion valve 76.

Since the tractor spring brakes remain applied, the control port 74 of the inversion valve 76 remains vented, so that pressure is delivered from supply port 78 to delivery port 80 thereof. Pressure at delivery port 80 is reduced to a predetermined maximum level by pressure reducing valve 84, and then supplied to the supply port 88 of synchronizing valve 90. However, since no signal is as yet present at control port 94 of synchronizing valve 90, the supply port 88 is cut off from the delivery port 92. The driver then effects a momentary service brake application by operation of the brake valve 116. Accordingly, a pressure signal is transmitted to inlet port 100 of double check valve 98. This pressure signal will be communicated to the control port 94 of synchronizing valve 90 and also to the trailer service line 46. Accordingly, the synchronizing valve 90 responds to the pressure signal at control point 94 to open the supply port 88 to the delivery port 92 thereof, thereby communicating a pressure signal to the other side of the double check valve 98 through inlet port 96. This pressure signal remains even after the brake valve 116 is released, since the synchronizing valve has been opened and is kept open because of the pressure communicated to the inlet port 96 of the double check valve 98. The pressure from delivery port 92 communicated through inlet port 96 of double check valve 98 is also communicated through outlet port 102 of the double check valve 98 to the trailer service line portion 46, thereby maintaining the service brake actuator of the actuation of the trailer brakes, even after the brake valve 116 is released.

When the vehicle operator is finished with the inspection and desires to move the vehicle, he climbs back into the cab and pushes in the knob 62, thereby supplying fluid pressure to the tractor parking brake actuation system indicated by the numeral 72, and also supplying pressure to control port 74 of inversion valve 76. Inversion valve 76 responds to pressure at control port 74 by cutting off communication between the ports 78, 80 of the inversion valve 76, and venting delivery port 80 to atmosphere. Accordingly, pressure at the supply port 88 of synchronizing valve 90 is also cut off, so that pressure to both sides of the double check valve 98 is now vented, thereby venting the signal at control port 94 of the synchronizing valve 90 and also venting the service brake actuation communicated through port 102 and the trailer service line portion 46. The service brake application has now been terminated and the vehicle can be moved. If the driver decides to abort the trip and park the vehicle, the control valve knob 64 can be pulled out, thereby venting the supply line 40 and also venting supply port 78 of inversion valve 76. Accordingly, pressure at delivery port 92 of synchronizing valve 90 is also vented, so that pressure delivered to inlet port 96 of double check valve 98 is also vented. Pressure at control port 94 of synchronizing valve 90 and the pressure at port 102 of double check valve 98 is also vented, thereby terminating the held service brake application and parking the vehicle through the use of the tractor and trailer spring brake actuators.

I claim:

1. Fluid pressure braking system for a vehicle comprising a fluid pressure source, service brake actuators responsive to fluid pressure from said source for effecting a service brake actuation, a parking brake system responsive to fluid pressure from said source for effecting a parking brake actuation, a service brake valve for controlling actuation of said service brake actuators, parking brake valve means for controlling said parking brake system, and control valve means responsive to both the fluid pressure level in said parking brake system and to actuation and release of said service brake valve for effecting and holding a service brake application at a predetermined fluid pressure level even after release of the service brake valve, said parking brake system including a pair of parking brake subsystems, said parking brake valve means including a first parking brake valve component for controlling the pressure level in one of said subsystem and a second parking brake valve component for controlling the pressure level in the other subsystem independently of the operation of the first parking brake valve component, said control valve means including means responsive to application of parking brakes in one of said subsystems while the parking brakes in the other subsystem are released and to actuation and release of said service brake valve while the parking brakes of said one subsystem are applied while the brakes of the other subsystem are released to effect said service brake application at said predetermined fluid pressure level.

2. Fluid pressure braking system as claimed in claim 1, wherein said vehicle includes a tractor portion and a trailer portion, one of said subsystems being carried by the tractor and the other subsystem being carried by the trailer.

3. Fluid pressure braking system as claimed in claim 2, wherein said control valve means effects and holds a service brake application after application and release of the service brake valve of only the service actuators carried on the trailer portion of a tractor trailer combination vehicle.

4. Fluid pressure braking system as claimed in claim 1, wherein said control valve means includes means for limiting the service brake application which is held after release of the service brake valve to a predetermined pressure level.

5. Fluid pressure braking system as claimed in claim 1, wherein said control valve means includes a normally closed valve opening in response to a control signal when the service brake valve is operated and released to generate a pressure signal opening said normally closed valve, and pressure responsive valve means responsive to said brake valve and to the pressure level communicated to said pressure responsive valve means by opening of the normally closed valve to generate said control signal.

6. Fluid pressure braking system as claimed in claim 5, wherein said control valve means includes a normally open valve which closes in response to control pressure applied thereto, said normally open valve being connected to the normally closed valve and closing in response to a predetermined pressure level in said one subsystem.

7. Fluid pressure braking system as claimed in claim 6, wherein said control valve means includes pressure limiting valve means limiting the pressure level communicated from said normally closed valve to the normally open valve to a predetermined pressure level.

8. Fluid pressure braking system as claimed in claim 1, wherein said one subsystem is on the tractor portion of a tractor-trailer combination vehicle and the other subsystem is on the trailer portion of a tractor-trailer combination vehicle.

9. Fluid pressure braking system as claimed in claim 8, wherein said service brake application is held only on the service actuators carried by the trailer portion after release of said brake valve.

* * * * *